US012482587B2

(12) United States Patent
Kawashima et al.

(10) Patent No.: US 12,482,587 B2
(45) Date of Patent: Nov. 25, 2025

(54) MAGNETIC FIELD GENERATING DEVICE

(71) Applicants: TERAL INC., Fukuyama (JP); NIIGATA UNIVERSITY, Niigata (JP)

(72) Inventors: Hiroshi Kawashima, Fukuyama (JP); Tetsuya Ito, Fukuyama (JP); Satoshi Fukui, Niigata (JP)

(73) Assignees: TERAL INC., Fukuyama (JP); NIIGATA UNIVERSITY, Niigata (JP)

( * ) Notice: Subject to any disclaimer, the term of this patent is extended or adjusted under 35 U.S.C. 154(b) by 301 days.

(21) Appl. No.: 18/555,539

(22) PCT Filed: Mar. 29, 2022

(86) PCT No.: PCT/JP2022/015723

§ 371 (c)(1),
(2) Date: Oct. 16, 2023

(87) PCT Pub. No.: WO2022/224761

PCT Pub. Date: Oct. 27, 2022

(65) Prior Publication Data

US 2024/0203627 A1 Jun. 20, 2024

(30) Foreign Application Priority Data

Apr. 20, 2021 (JP) ................................ 2021-071385

(51) Int. Cl.
*H01F 6/06* (2006.01)
*H01F 6/04* (2006.01)
*H01F 27/24* (2006.01)

(52) U.S. Cl.
CPC ................ *H01F 6/06* (2013.01); *H01F 6/04* (2013.01); *H01F 27/24* (2013.01)

(58) Field of Classification Search
CPC ... H01F 6/04; H01F 6/06; H01F 27/24; H01F 7/20; Y02E 40/60
See application file for complete search history.

(56) References Cited

U.S. PATENT DOCUMENTS 4,682,111 A 7/1987 Hughes
2009/0264295 A1 10/2009 Nardelli et al.

FOREIGN PATENT DOCUMENTS

JP 2005123084 A 5/2005
JP 2008072886 A * 3/2008
(Continued)

OTHER PUBLICATIONS

Jul. 26, 2022, International Search Report issued in the International Patent Application No. PCT/JP2022/015723.
(Continued)

*Primary Examiner* — Mohamad A Musleh
(74) *Attorney, Agent, or Firm* — KENJA IP LAW PC

(57) ABSTRACT

A magnetic field generating device 1 comprises: an iron core 2; a pair of superconducting coils 3; and one or a pair of vacuum heat-insulation containers 4, wherein the iron core includes: a yoke 21; and a pair of split iron core portions 22 that are formed separately from the yoke, are located inside the yoke, and face each other with a work space therebetween, each of the pair of superconducting coils is wound around a different one of the pair of split iron core portions in a circumferential direction about an axis that is parallel to a direction in which the pair of split iron core portions face each other, a pair of split iron core coil assemblies 5 are stored in the one or pair of vacuum heat-insulation containers, and the yoke is located outside the one or pair of vacuum heat-insulation containers.

3 Claims, 8 Drawing Sheets

(56) References Cited

FOREIGN PATENT DOCUMENTS

| | | | | | |
|---|---|---|---|---|---|
| JP | 2014233525 | A | | 12/2014 | |
| WO | WO-2007148722 | A1 | * | 12/2007 | ............... H01F 6/06 |

OTHER PUBLICATIONS

Oct. 24, 2023, International Preliminary Report on Patentability issued in the International Patent Application No. PCT/JP2022/015723.

* cited by examiner

A-A SECTIONAL VIEW

MAGNETIC FIELD GENERATING DEVICE

TECHNICAL FIELD

The present disclosure relates to a magnetic field generating device.

The present application claims priority to and the benefit of Japanese Patent Application No. 2021-071385 filed Apr. 20, 2021, the entire contents of which are incorporated herein by reference.

BACKGROUND

Conventionally, there are magnetic field generating devices that include a substantially C-shaped iron core and a pair of coils wound around a pair of ends of the iron core (for example, JP 2005-123084 A (PTL 1)).

CITATION LIST

Patent Literature

PTL 1: JP 2005-123084 A

SUMMARY

Technical Problem

In such conventional magnetic field generating devices, in the case where superconducting coils are used as the coils, the superconducting coils need to be cooled. One conceivable cooling method is to store the entire iron core and pair of coils in a vacuum heat-insulation container. This, however, requires a large vacuum heat-insulation container.

It could therefore be helpful to provide a magnetic field generating device that can reduce the size of a vacuum heat-insulation container.

Solution to Problem

A magnetic field generating device according to the present disclosure comprises: an iron core; a pair of superconducting coils; and one or a pair of vacuum heat-insulation containers, wherein the iron core includes: a substantially C-shaped or substantially U-shaped yoke; and a pair of split iron core portions that are formed separately from the yoke, are located inside the yoke, and face each other with a work space therebetween, each of the pair of superconducting coils is wound around a different one of the pair of split iron core portions in a circumferential direction about an axis that is parallel to a direction in which the pair of split iron core portions face each other, a pair of split iron core coil assemblies each composed of the split iron core portion and the superconducting coil wound around the split iron core portion are stored in the one or pair of vacuum heat-insulation containers, and the yoke is located outside the one or pair of vacuum heat-insulation containers.

Preferably, in the magnetic field generating device according to the present disclosure, in at least one of the pair of split iron core coil assemblies, an outer circumferential surface of the split iron core portion has an annular stepped portion that faces the work space and is recessed toward an inner side in an orthogonal-to-axis direction, and the superconducting coil is wound around the stepped portion in the circumferential direction.

In the magnetic field generating device according to the present disclosure, in at least one of the pair of split iron core coil assemblies, an outer circumferential surface of the split iron core portion may have an annular groove, and the superconducting coil may be wound around the groove in the circumferential direction.

Advantageous Effect

It is thus possible to provide a magnetic field generating device that can reduce the size of a vacuum heat-insulation container.

DETAILED DESCRIPTION

A magnetic field generating device according to the present disclosure can be used for any purpose, such as a heating device for aluminum billets.

An embodiment of a magnetic field generating device according to the present disclosure will be described below, with reference to the drawings.

Figure 1:
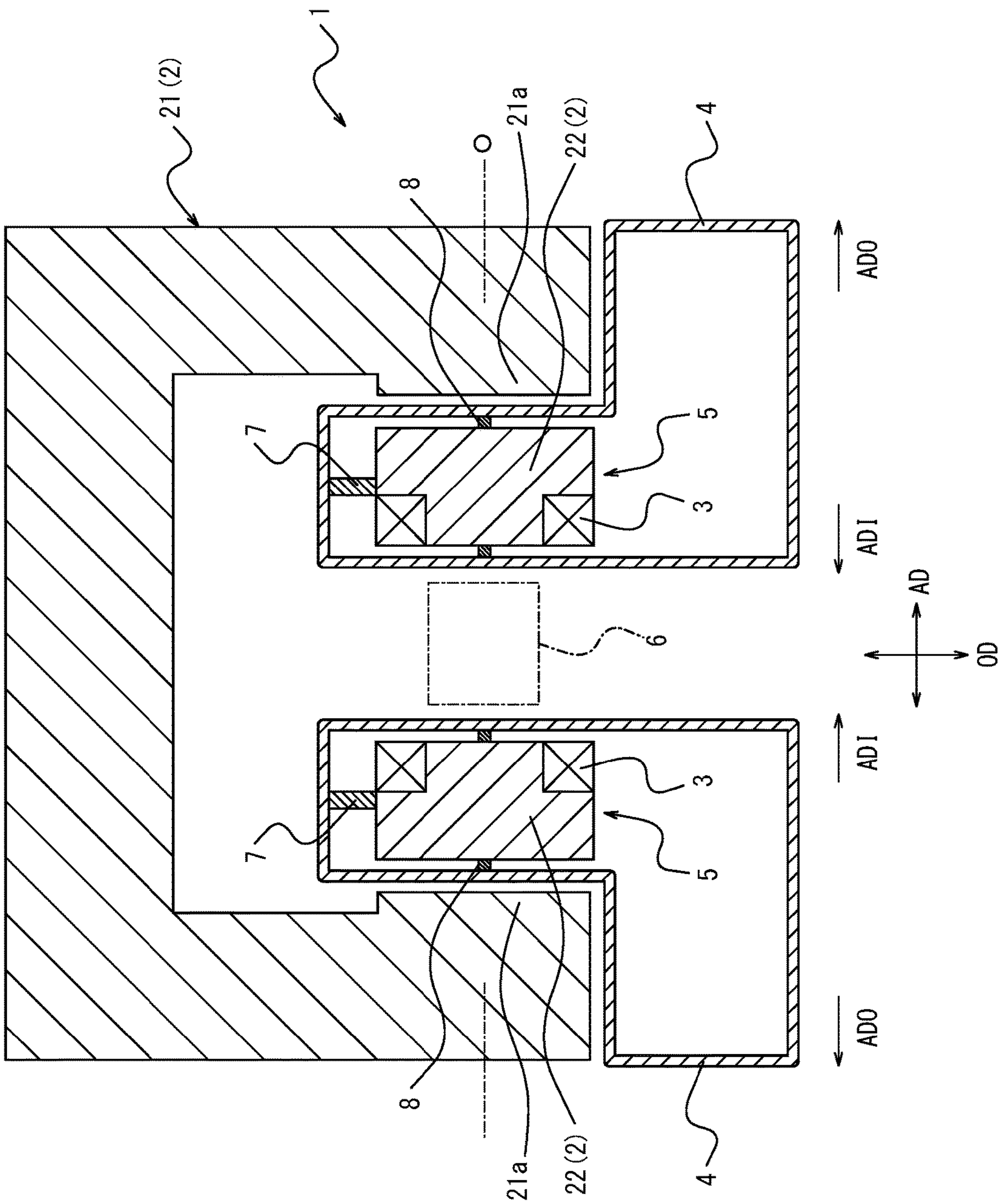
FIG. 1 is a sectional view schematically illustrating a magnetic field generating device according to an embodiment of the present disclosure.
Figure 2:
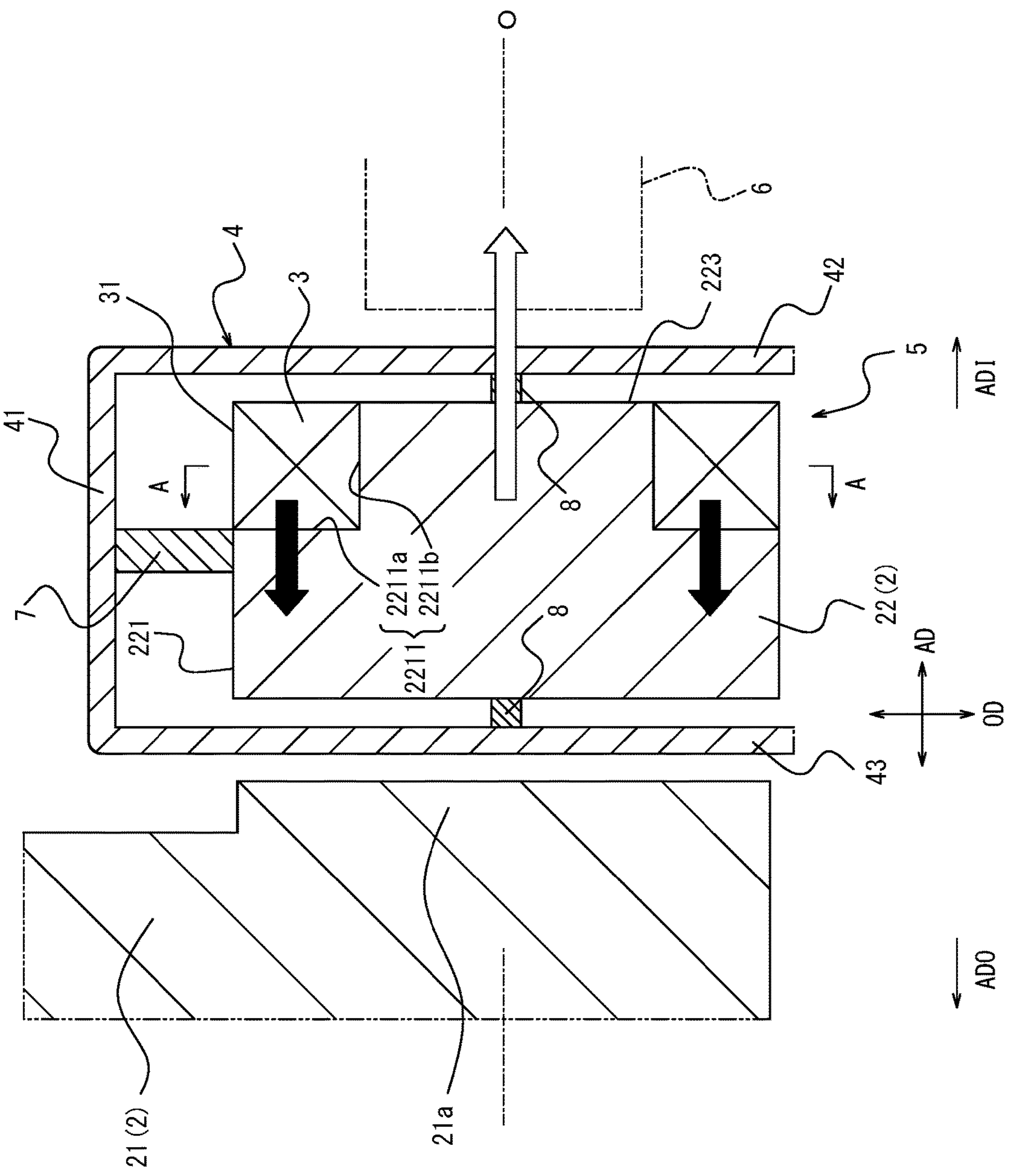
FIG. 2 is an enlarged view of part of the magnetic field generating device in FIG. 1.
Figure 3:
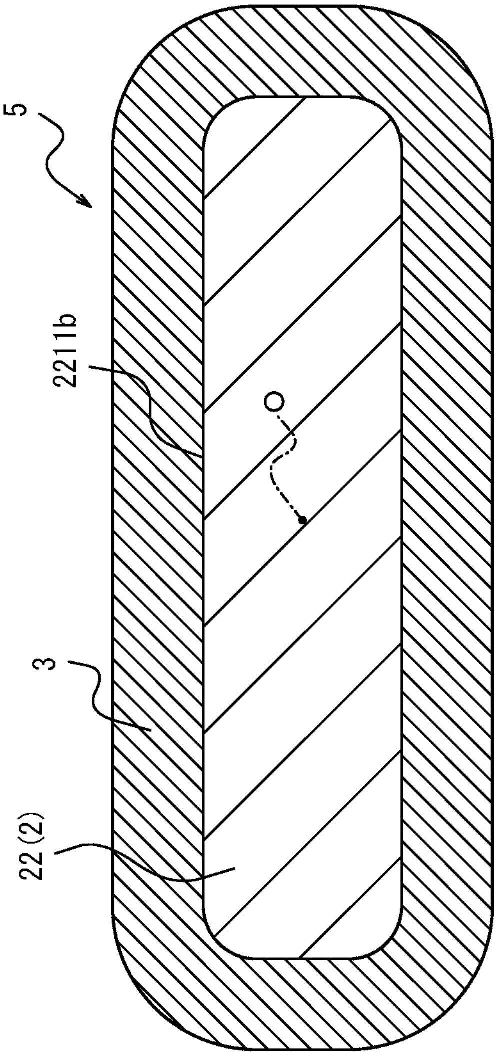
FIG. 3 is an A-A sectional view illustrating part of the magnetic field generating device in FIG. 2 taken along line A-A.

FIGS. 1 to 3 illustrate a magnetic field generating device 1 according to an embodiment of the present disclosure.

As illustrated in FIG. 1, the magnetic field generating device 1 in this embodiment includes an iron core 2, a pair of superconducting coils 3, and a pair of vacuum heat-insulation containers 4.

The iron core 2 includes a yoke 21 and a pair of split iron core portions 22.

The yoke 21 contains iron, and is configured to pass magnetic flux. The yoke 21 is substantially C-shaped or substantially U-shaped (substantially C-shaped in the example in FIG. 1). The yoke 21 has a pair of ends **21*a*. In the example in FIG. 1, the yoke 21 is oriented so that the pair of ends 21*a* face the work space 6 side. The ends 21*a* of the yoke 21 may, however, face any direction as long as the yoke 21 has surfaces that face the surfaces of the split iron core portions 22** on the outer side in the axial direction ADO with a narrow gap therebetween.

The pair of split iron core portions 22 contain iron, and are configured to pass magnetic flux. The pair of split iron core portions 22 are formed separately from the yoke 21. The pair of split iron core portions 22 are located inside the yoke 21, and face each other with the workspace 6 therebetween. The work space 6 is an air gap.

Thus, the iron core 2 is substantially C-shaped.

In this specification, a direction parallel to an axis O that passes through the pair of split iron core portions 22 and extends in a direction in which the pair of split iron core portions 22 face each other is referred to as "axial direction AD". The side closer to the work space 6 in the axial direction AD is referred to as "inner side in the axial direction ADI", and the side farther from the work space 6 in the axial direction AD is referred to as "outer side in the axial direction ADO". A direction perpendicular to the axial direction AD is referred to as "orthogonal-to-axis direction OD". The side closer to the axis O in the orthogonal-to-axis direction OD is referred to as "inner side in the orthogonal-to-axis direction", and the side farther from the axis O in the orthogonal-to-axis direction OD is referred to as "outer side in the orthogonal-to-axis direction". In this specification, the circumferential direction about the axis O is also simply referred to as "circumferential direction". The terms "outer circumferential side" and "inner circumferential side" respectively refer to the outer circumferential side and inner circumferential side with respect to the axis O, unless otherwise specified.

The pair of split iron core portions 22 and the pair of ends 21*a* of the yoke 21 face each other in the axial direction AD. The pair of split iron core portions 22 are located on the inner side in the axial direction ADI relative to the pair of ends 21*a* of the yoke 21. The surfaces of the pair of split iron core portions 22 on the outer side in the axial direction ADO face the pair of surfaces of the yoke 21 on the inner side in the axial direction ADI with a narrow gap therebetween.

As illustrated in FIGS. 1 to 3, a superconducting coil 3 is wound around each split iron core portion 22 in the circumferential direction about the axis O (so as to surround the axis O). The superconducting coil 3 is located on the outer circumferential side of the outer circumferential surface 221 of the split iron core portion 22 (specifically, the below-described stepped portion 2211 of the outer circumferential surface 221), and faces the outer circumferential surface 221 in a state of being separated from the outer circumferential surface 221 in the radial direction or is in contact with the outer circumferential surface 221.

The superconducting coil 3 includes at least a coil body containing a superconductor. The coil body of the superconducting coil 3 is in a strip shape, for example. The superconducting coil 3 may further include, in addition to the coil body, a coil case that stores the coil body therein. The coil case is made of, for example, resin.

In the example in FIG. 3, the superconducting coil 3 has a substantially rectangular annular shape that surrounds the axis O in the cross section in the orthogonal-to-axis direction OD. However, the superconducting coil 3 may have any annular shape such as a substantially circular annular shape or a substantially elliptical annular shape, as long as it is an annular shape that surrounds the axis O in the cross section in the orthogonal-to-axis direction OD.

The magnetic field generating device 1 includes a current supply unit (not illustrated) for supplying current (for example, direct current) to each superconducting coil 3.

Each split iron core portion 22 and the superconducting coil 3 wound around the split iron core portion 22 constitute a split iron core coil assembly 5. That is, the split iron core coil assembly 5 is composed of the split iron core portion 22 and the superconducting coil 3 wound around the split iron core portion 22. The magnetic field generating device 1 includes a pair of split iron core coil assemblies 5.

Each split iron core coil assembly 5 is stored in a corresponding vacuum heat-insulation container 4. The yoke 21 is located outside the pair of vacuum heat-insulation containers 4. The pair of vacuum heat-insulation containers 4 face each other in the axial direction AD with the work space 6 therebetween. As illustrated in FIG. 2, the wall 42 of the vacuum heat-insulation container 4 on the inner side in the axial direction ADI is located between the split iron core coil assembly 5 and the work space 6, and the wall 43 of the vacuum heat-insulation container 4 on the outer side in the axial direction ADO is located between the split iron core coil assembly 5 and the end 21*a* of the yoke 21.

The magnetic field generating device 1 includes a refrigerator (not illustrated). The refrigerator cools the equipment inside each vacuum heat-insulation container 4. The vacuum heat-insulation container 4 is configured to keep the temperature of the internal equipment cooled by the refrigerator. The vacuum heat-insulation container 4 is thus configured to, together with the refrigerator, cool the split iron core coil assembly 5 and thus the superconducting coil 3 and maintain it at ultralow temperature. Specifically, the superconducting coil 3 is cooled until the superconductor becomes superconducting (i.e. until the electrical resistance reaches substantially zero).

It is preferable that the vacuum heat-insulation container 4 is not only evacuated but also has a laminated heat-insulation material on part or all of its walls. The laminated heat-insulation material is formed, for example, by laminating a plurality of metal vapor-deposited resin films and resin nets. Examples of the material forming the main body of the vacuum heat-insulation container 4 include austenitic stainless steel and composite glass fiber reinforced plastic (GFRP).

The vacuum heat-insulation container 4 may be configured to cool the split iron core coil assembly 5 and thus the superconducting coil 3 by any method other than the above, as long as the split iron core coil assembly 5 is stored therein.

In the magnetic field generating device 1 having the above-described structure, when the current supply unit (not illustrated) supplies current to each superconducting coil 3, magnetic flux passes through the iron core 2 (the yoke 21 and the pair of split iron core portions 22), and a strong magnetic field is generated in the work space 6.

The strong magnetic field generated in the work space 6 may be used for any purpose.

For example, the magnetic field generating device 1 may be used in a heating device for aluminum billets. In this case, the heating device includes, in addition to the magnetic field generating device 1, a motor for rotating the aluminum billet. A direct current is passed through each superconducting coil 3, as a result of which a strong DC magnetic field is generated in the work space 6. The aluminum billet is placed in the work space 6 such that the central axis of the aluminum billet will be perpendicular to the axial direction AD and also horizontal, and is rotated around the central axis of the aluminum billet by the motor. This is equivalent to applying an AC magnetic field to the aluminum billet, so that an induced current flows in the aluminum billet and the aluminum billet is heated.

The effects in this embodiment will be described below.

First, according to this embodiment, since the magnetic field generating device 1 includes the superconducting coils 3, a stronger magnetic field can be generated in the work space 6 than in the case where the magnetic field generating device 1 includes, for example, typical copper coils instead of the superconducting coils 3.

Moreover, according to this embodiment, since the magnetic field generating device 1 includes the iron core 2, a strong magnetic field can be generated while reducing the amount of superconductor used for the production of the superconducting coils 3 as compared with the case where the magnetic field generating device 1 does not include the iron core 2. Hence, the amount of superconductor can be reduced and consequently the cost can be reduced. Given that superconductors are usually expensive, superconductor reduction is highly effective in cost reduction.

Moreover, according to this embodiment, since the iron core 2 in the magnetic field generating device 1 includes the yoke 21, the magnetic circuit resistance can be reduced and the magnetic flux can be increased as compared with the case where the iron core 2 does not include the yoke 21.

Moreover, according to this embodiment, the iron core 2 is divided into the yoke 21 and the pair of split iron core portions 22, the split iron core coil assemblies 5 are stored in the respective vacuum heat-insulation containers 4, and the yoke 21 is located outside the pair of vacuum heat-insulation containers 4, as described above. This can reduce the size of the vacuum heat-insulation containers 4 as compared with the case where an undivided substantially C-shaped iron core and a pair of superconducting coils wound around a pair of ends of the iron core are entirely stored in a vacuum heat-insulation container. Hence, heat penetration from outside can be reduced, with it being possible to save energy.

In the case of using an undivided substantially C-shaped iron core, the size of the vacuum heat-insulation container may be able to be reduced by forming the vacuum heat-insulation container toroidally so as to store only each of a pair of superconducting coils surrounding the respective pair of ends of the iron core. In such a case, however, a wall of the vacuum heat-insulation container is located between the iron core and the superconducting coil, that is, the iron core and the superconducting coil are separated from each other. This causes an increase in the circumference of the superconducting coil and thus an increase in the amount of superconducting coil used, leading to an increase in cost. In addition, since leakage magnetic flux increases due to the separation between the core and the superconducting coil, the amount of superconductor that needs to be used increases, leading to an increase in cost. According to this embodiment, the superconducting coil 3 is wound directly around the iron core 2 (specifically, the split iron core portion 22), and thus the iron core 2 (specifically, the split iron core portion 22) and the superconducting coil 3 are in contact with each other with there being no distance therebetween. Therefore, the circumference of the superconducting coil 3 can be shortened and consequently the amount of superconductor can be reduced and the cost can be reduced as compared with the case where the vacuum heat-insulation container is toroidal as mentioned above. In addition, since the iron core 2 (specifically, the split iron core portion 22) and the superconducting coil 3 are in contact with each other with there being no distance therebetween, leakage magnetic flux can be reduced and consequently the amount of superconductor can be reduced and the cost can be reduced as compared with the case where the vacuum heat-insulation container is toroidal as mentioned above. Furthermore, since the iron core 2 (specifically, the split iron core portion 22) and the superconducting coil 3 are in contact with each other, the cool storage effect of the iron core 2 (specifically, the split iron core portion 22) can be utilized to suppress a temperature rise of the superconducting coil 3, so that the cooling load of the refrigerator can be reduced and the superconducting coil can be sufficiently cooled to enable effective use of superconductor capabilities, as compared with the case where the vacuum heat-insulation container is toroidal as mentioned above.

Moreover, according to this embodiment, in each split iron core coil assembly 5, the Lorentz force (black arrow in FIG. 2) acting on the superconducting coil 3 toward the outer side in the axial direction ADO and the electromagnetic force (white arrow in FIG. 2) acting on the split iron core portion 22 toward the inner side in the axial direction ADI cancel each other out during energization, as a result of which the force acting on the split iron core coil assembly 5 in the axial direction AD decreases. This makes it possible to simplify the support structure for supporting the split iron core coil assembly 5 in the vacuum heat-insulation container 4. Consequently, heat penetration into the superconducting coil 3 from outside via the support structure can be reduced, so that the cooling load of the refrigerator can be reduced and the superconducting coil can be sufficiently cooled to enable effective use of superconductor capabilities.

In this embodiment, the magnetic field generating device 1 includes a support member 7 as a support structure for supporting the split iron core coil assembly 5 in the vacuum heat-insulation container 4, as illustrated in FIGS. 1 and 2. The support member 7 is configured to suspend the split iron core coil assembly 5 from the vacuum heat-insulation container 4. More specifically, in this example, the support member 7 is a bar-shaped member having low heat conductivity, and is configured to suspend the split iron core coil assembly 5 from the upper wall 41 of the vacuum heat-insulation container 4 in a thermally insulated state. The support member 7 is thus configured to support the weight of the split iron core coil assembly 5, and is not configured to restrict the horizontal movement of the split iron core coil assembly. Hence, in this embodiment, the support structure (support member 7) for supporting the split iron core coil assembly 5 in the vacuum heat-insulation container 4 is simplified.

The support structure for supporting the split iron core coil assembly 5 in the vacuum heat-insulation container 4 is not limited to such, and may be any structure.

In this embodiment, the magnetic field generating device 1 includes a spacer member 8 between the split iron core coil assembly 5 and each of the walls 42 and 43 of the vacuum heat-insulation container 4 on both sides in the axial direction AD, as illustrated in FIGS. 1 to 2. This can suppress excessive movement of the split iron core coil assembly 5 in the axial direction AD during energization and the like more effectively. The spacer member 8 also maintains the gap between the split iron core coil assembly 5 and the vacuum heat-insulation container 4 during non-energization, with it being possible to reduce heat penetration when energization is stopped.

For example, the spacer member 8 may be fixed to or integrally formed with the split iron core portion 22 of the split iron core coil assembly 5, and formed separately from and not fixed to the corresponding one of the walls 42 and 43 of the vacuum heat-insulation container 4 on both sides in the axial direction AD. Alternatively, the spacer member 8 may be formed separately from and not fixed to the split iron core coil assembly 5, and fixed to or integrally formed with the corresponding one of the walls 42 and 43 of the vacuum heat-insulation container 4 on both sides in the axial direction AD.

The spacer member 8 may be omitted.

In this embodiment, the outer circumferential surface 221 of the split iron core portion 22 in each of the pair of split iron core coil assemblies 5 has an annular stepped portion 2211, as illustrated in FIGS. 1 to 2. The stepped portion 2211 extends along the entire circumference in the circumferential direction about the axis O. The stepped portion 2211 faces the work space 6 (via the wall 42 of the vacuum heat-insulation container 4). The stepped portion 2211 is recessed to the inner side in the orthogonal-to-axis direction. Specifically, the stepped portion 2211 has an orthogonal surface 2211*a* that is substantially parallel to the orthogonal-to-axis direction OD and faces the inner side in the axial direction ADI, and an axial surface 2211*b* that extends substantially parallel to the axial direction AD from the orthogonal surface 2211*a* to the end surface 223 of the split iron core portion 22 on the inner side in the axial direction ADI. The superconducting coil 3 is wound around the stepped portion 2211 in the circumferential direction about the axis O.

Since the superconducting coil 3 and the split iron core portion 22 face each other in the axial direction AD in this way, the Lorentz force (black arrow in FIG. 2) acting on the superconducting coil 3 toward the outer side in the axial direction ADO and the electromagnetic force (white arrow in FIG. 2) acting on the split iron core portion 22 toward the inner side in the axial direction ADI cancel each other out more effectively, as a result of which the force acting on the split iron core coil assembly 5 in the axial direction AD further decreases. This makes it possible to further simplify the support structure for supporting the split iron core coil assembly 5 in the vacuum heat-insulation container 4. In addition, although the Lorentz force (black arrow in FIG. 2) toward the outer side in the axial direction ADO acts on the superconducting coil 3, the stepped portion 2211 (in particular, the orthogonal surface 2211*a*) restricts the movement of the superconducting coil 3 toward the outer side in the axial direction ADO. That is, the stepped portion 2211 has a function of restricting the movement of the superconducting coil 3 toward the outer side in the axial direction ADO. This makes it unnecessary to additionally provide a restriction structure for restricting the movement of the superconducting coil 3 toward the outer side in the axial direction ADO. Consequently, heat penetration into the superconducting coil 3 from outside via the restriction structure can be reduced and accordingly the temperature rise of the superconducting coil 3 can be suppressed, so that the cooling load of the refrigerator can be reduced and the superconducting coil can be sufficiently cooled to enable effective use of superconductor capabilities. Since the inner side in the axial direction ADI of the superconducting coil 3 faces the work space 6 (via the wall 42 of the vacuum heat-insulation container 4) without being covered with the split iron core portion 22, a stronger magnetic field can be generated in the work space 6. Furthermore, since the superconducting coil 3 is in contact with not only the axial surface 2211*b* of the stepped portion 2211 but also the orthogonal surface 2211*a* of the stepped portion 2211, the area of contact between the superconducting coil 3 and the split iron core portion 22 increases, as a result of which the effect of cooling the superconducting coil 3 via the split iron core portion 22 is improved.

The stepped portion 2211 is preferably provided in both of the pair of split iron core coil assemblies 5, but may be provided in only one of the pair of split iron core coil assemblies 5.

Figure 4:
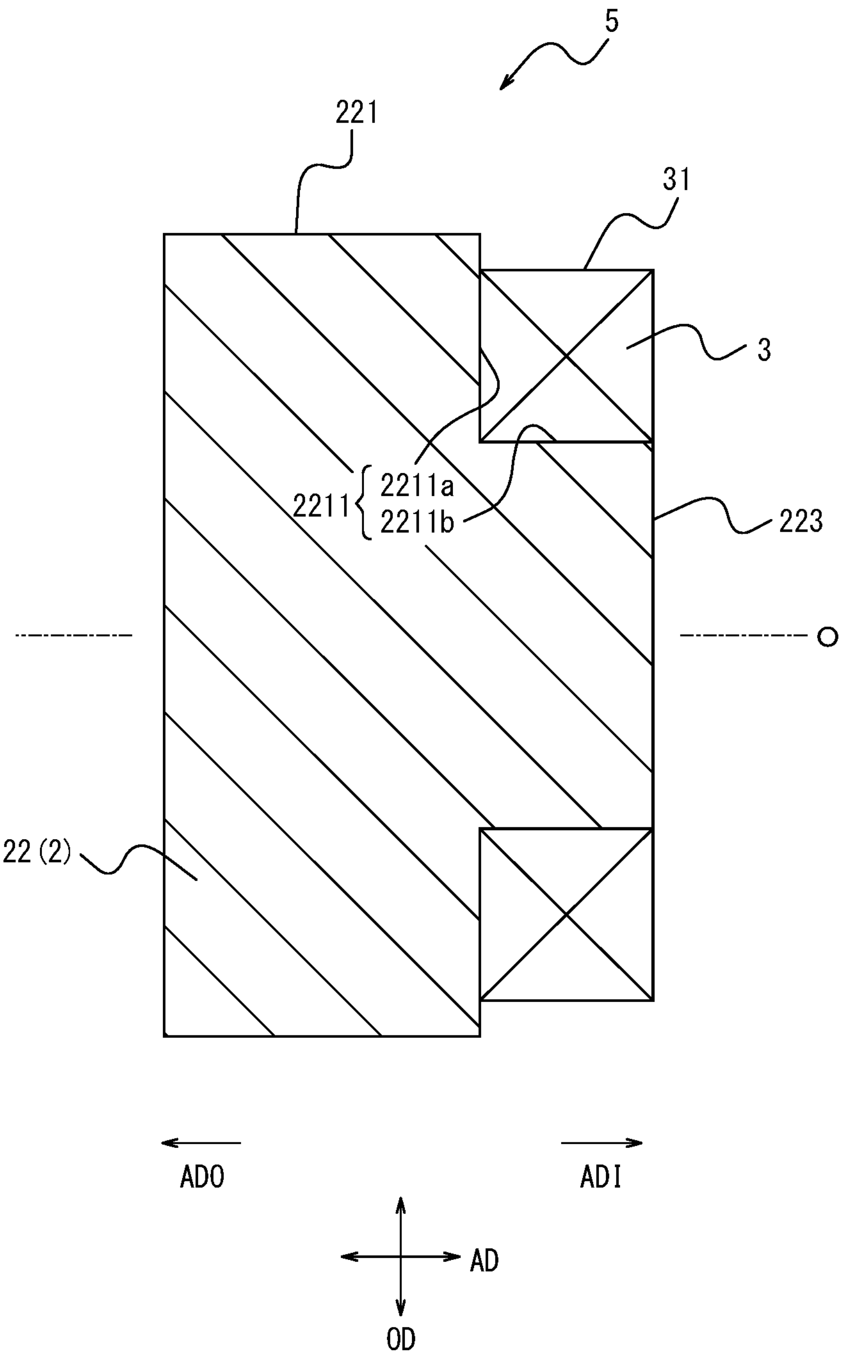
FIG. 4 is a sectional view schematically illustrating a first modification of a split iron core coil assembly.
Figure 5:
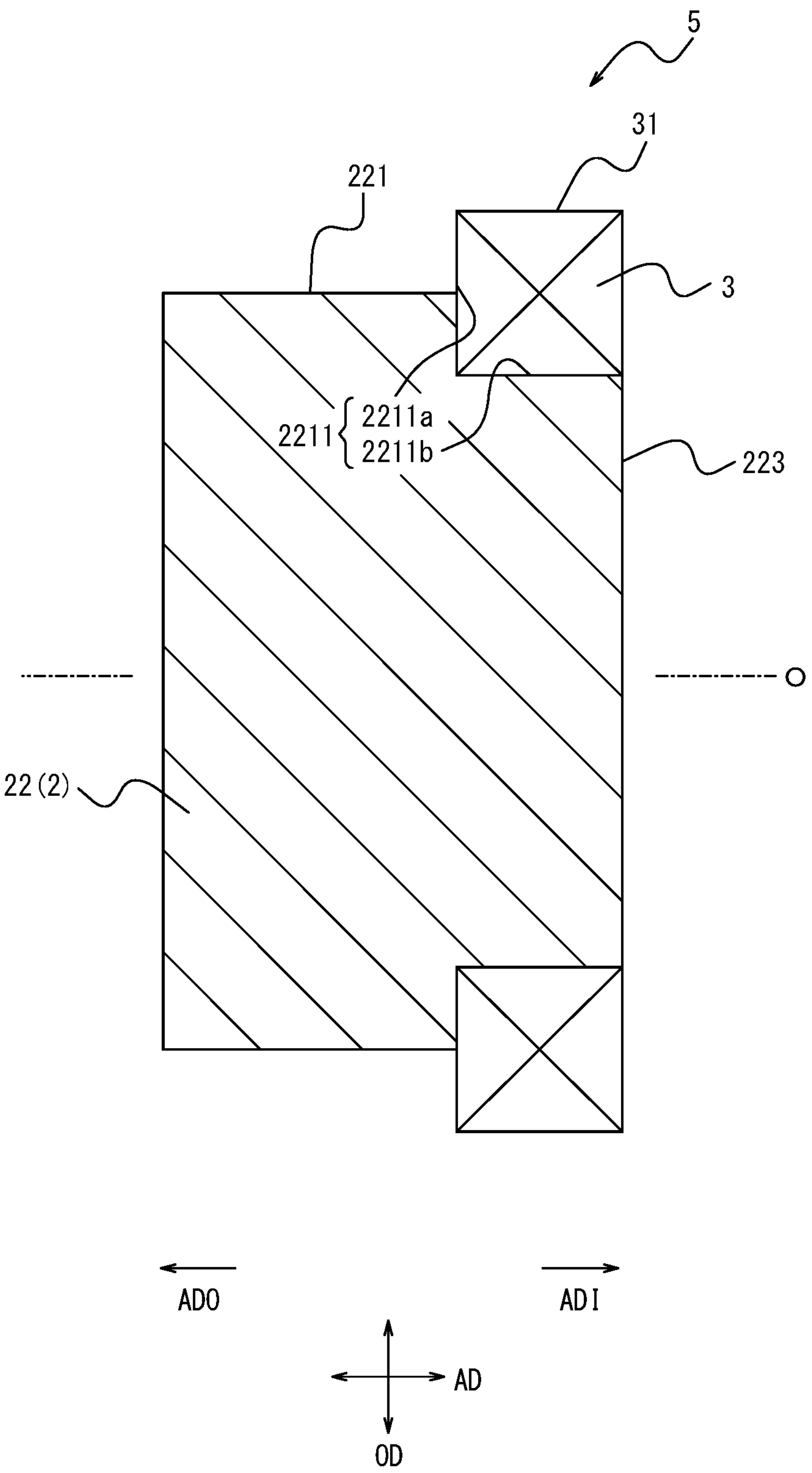
FIG. 5 is a sectional view schematically illustrating a second modification of a split iron core coil assembly.

In each example described in this specification, in at least one of the pair of split iron core coil assemblies 5, the outer circumferential surface 31 of the superconducting coil 3 may be at the same position in the orthogonal-to-axis direction OD as the outer circumferential surface 221 of the split iron core portion 22 as illustrated in FIG. 2, may be on the inner circumferential side relative to the outer circumferential surface 221 of the split iron core portion 22 as illustrated in FIG. 4, or may be on the outer circumferential side relative to the outer circumferential surface 221 of the split iron core portion 22 as illustrated in FIG. 5.

Figure 6:
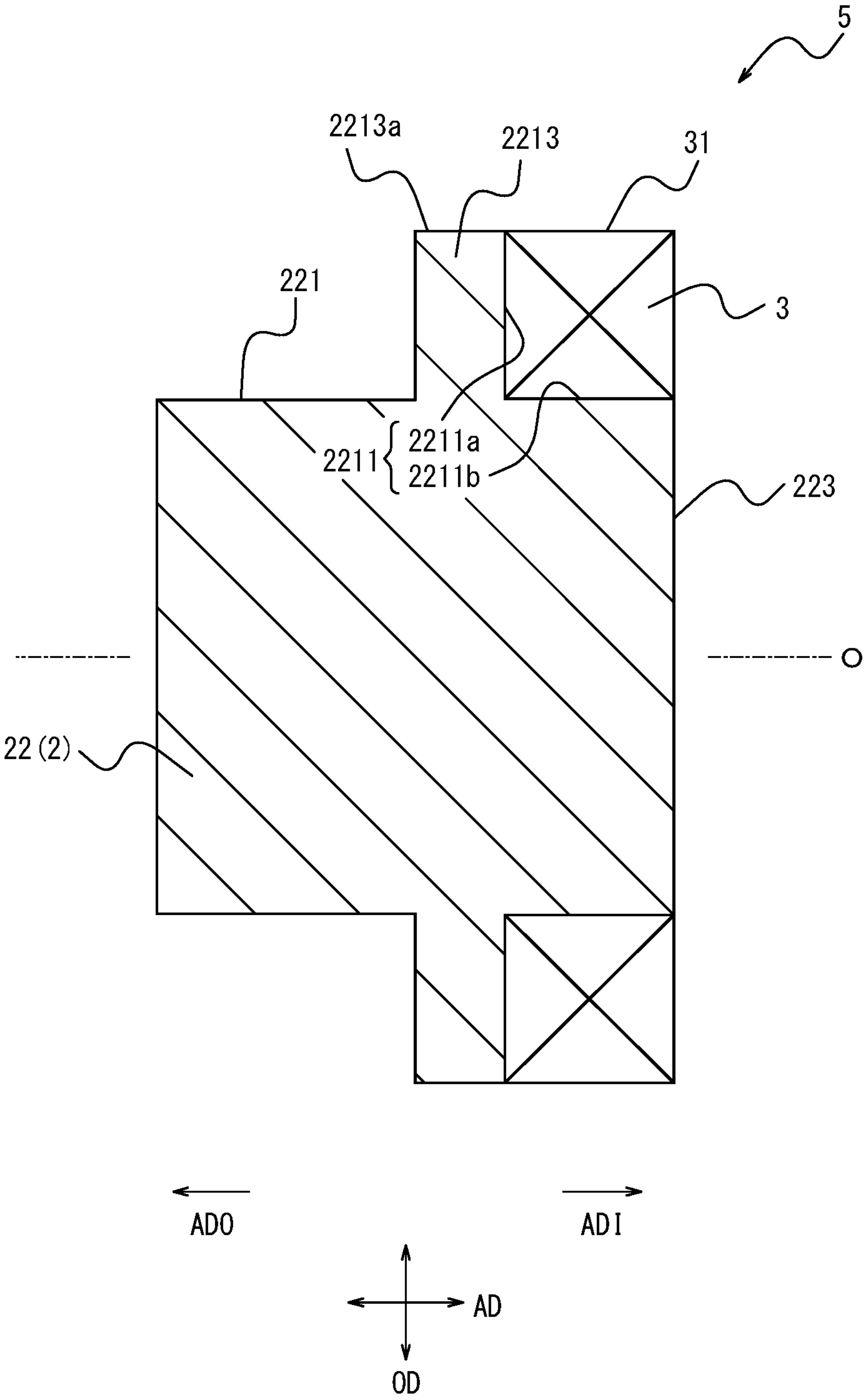
FIG. 6 is a sectional view schematically illustrating a third modification of a split iron core coil assembly.

In each example described in this specification, in at least one of the pair of split iron core coil assemblies 5, the outer circumferential surface 221 of the split iron core portion 22 may have a protrusion 2213 projecting to the outer circumferential side, and the stepped portion 2211 may be provided at the protrusion 2213, as illustrated in FIG. 6. In this case, the outer circumferential surface 31 of the superconducting coil 3 may be at the same position in the orthogonal-to-axis direction OD as the outer circumferential surface 2213*a* of the protrusion 2213 as illustrated in FIG. 6, may be on the inner circumferential side relative to the outer circumferential surface 2213*a* of the protrusion 2213, or may be on the outer circumferential side relative to the outer circumferential surface 2213*a* of the protrusion 2213.

Figure 7:
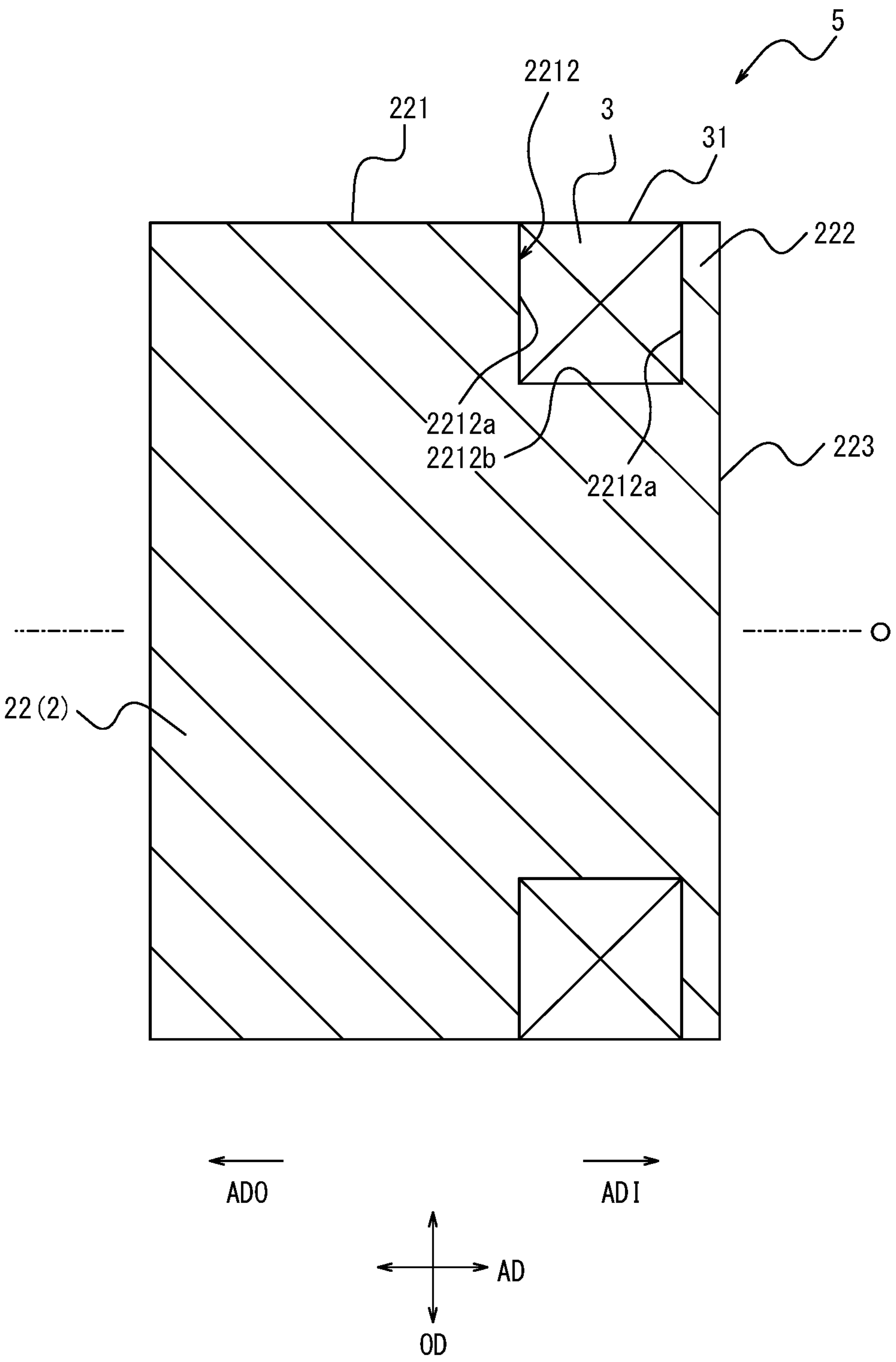
FIG. 7 is a sectional view schematically illustrating a fourth modification of a split iron core coil assembly.

In at least one of the pair of split iron core coil assemblies 5, the outer circumferential surface 221 of the split iron core portion 22 may have an annular groove 2212, as illustrated in FIG. 7. The groove 2212 extends along the entire circumference in the circumferential direction about the axis O. The groove 2212 is open on the outer circumferential side. The groove 2212 has a pair of groove wall surfaces 2212*a* that face each other and are each substantially parallel to the orthogonal-to-axis direction OD, and a groove bottom surface 2212*b* that faces the outer circumferential side and is substantially parallel to the axial direction AD. In this case, the superconducting coil 3 is wound around the groove 2212 in the circumferential direction, and thus is stored in the groove 2212.

In this case as in the case where the superconducting coil 3 is wound around the stepped portion 2211 (FIGS. 1 to 6), since the superconducting coil 3 and the split iron core portion 22 face each other in the axial direction AD, the Lorentz force acting on the superconducting coil 3 toward the outer side in the axial direction ADO and the electromagnetic force acting on the split iron core portion 22 toward the inner side in the axial direction ADI cancel each other out more effectively, as a result of which the force acting on the split iron core coil assembly 5 in the axial direction AD further decreases. This makes it possible to further simplify the support structure for supporting the split iron core coil assembly 5 in the vacuum heat-insulation container 4. In addition, although the Lorentz force toward the outer side in the axial direction ADO acts on the superconducting coil 3, the groove 2212 (in particular, the groove wall surface 2212*a* of the groove 2212 on the outer side in the axial direction ADO) restricts the movement of the superconducting coil 3 toward the outer side in the axial direction ADO. That is, the groove 2212 has a function of restricting the movement of the superconducting coil 3 toward the outer side in the axial direction ADO. This makes it unnecessary to additionally provide a restriction structure for restricting the movement of the superconducting coil 3 toward the outer side in the axial direction ADO. Consequently, heat penetration into the superconducting coil 3 from outside via the restriction structure can be reduced and accordingly the temperature rise of the superconducting coil 3 can be suppressed, so that the cooling load of the refrigerator can be reduced and the superconducting coil can be sufficiently cooled to enable effective use of superconductor capabilities. Furthermore, since the superconducting coil 3 is in contact with not only the groove bottom surface 2212*b* of the groove 2212 but also the groove wall surfaces 2212*a* of the groove 2212, the area of contact between the superconducting coil 3 and the split iron core portion 22 increases, as a result of which the effect of cooling the superconducting coil 3 via the split iron core portion 22 is improved.

In this case, when the wall portion 222 of the split iron core portion 22 between the groove 2212 and the end surface 223 of the split iron core portion 22 on the inner side in the axial direction ADI is thinner in the axial direction AD, magnetic flux saturation is more likely to occur in the wall portion 222 during energization, so that a stronger magnetic field can be generated in the work space 6. From this viewpoint, the thickness of the wall portion 222 in the axial direction AD is preferably 3 mm or less. From the same viewpoint, the center of the groove 2212 in the axial direction AD is preferably located on the inner side in the axial direction ADI relative to the center of the split iron core portion 22 in the axial direction AD.

In at least one of the pair of split iron core coil assemblies 5, the superconducting coil 3 may be wound around the outer circumferential surface 221 of the split iron core portion 22 without unevenness such as the stepped portion 2211 or the groove 2212. In such a case, too, the Lorentz force acting on the superconducting coil 3 toward the outer side in the axial direction ADO and the electromagnetic force acting on the split iron core portion 22 toward the inner side in the axial direction ADI cancel each other out, as a result of which the force acting on the split iron core coil assembly 5 in the axial direction AD decreases. This makes it possible to simplify the support structure for supporting the split iron core coil assembly 5 in the vacuum heat-insulation container 4. This effect is, however, greater in the case where the superconducting coil 3 is wound around the stepped portion 2211 or groove 2212 of the outer circumferential surface 221 of the split iron core portion 22 as illustrated in FIGS. 1 to 7. In the case where the superconducting coil 3 is wound around the outer circumferential surface 221 of the split iron core portion 22 without unevenness such as the stepped portion 2211 or the groove 2212, it is preferable to additionally provide a restriction structure for restricting the movement of the superconducting coil 3 toward the outer side in the axial direction ADO.

Figure 8:
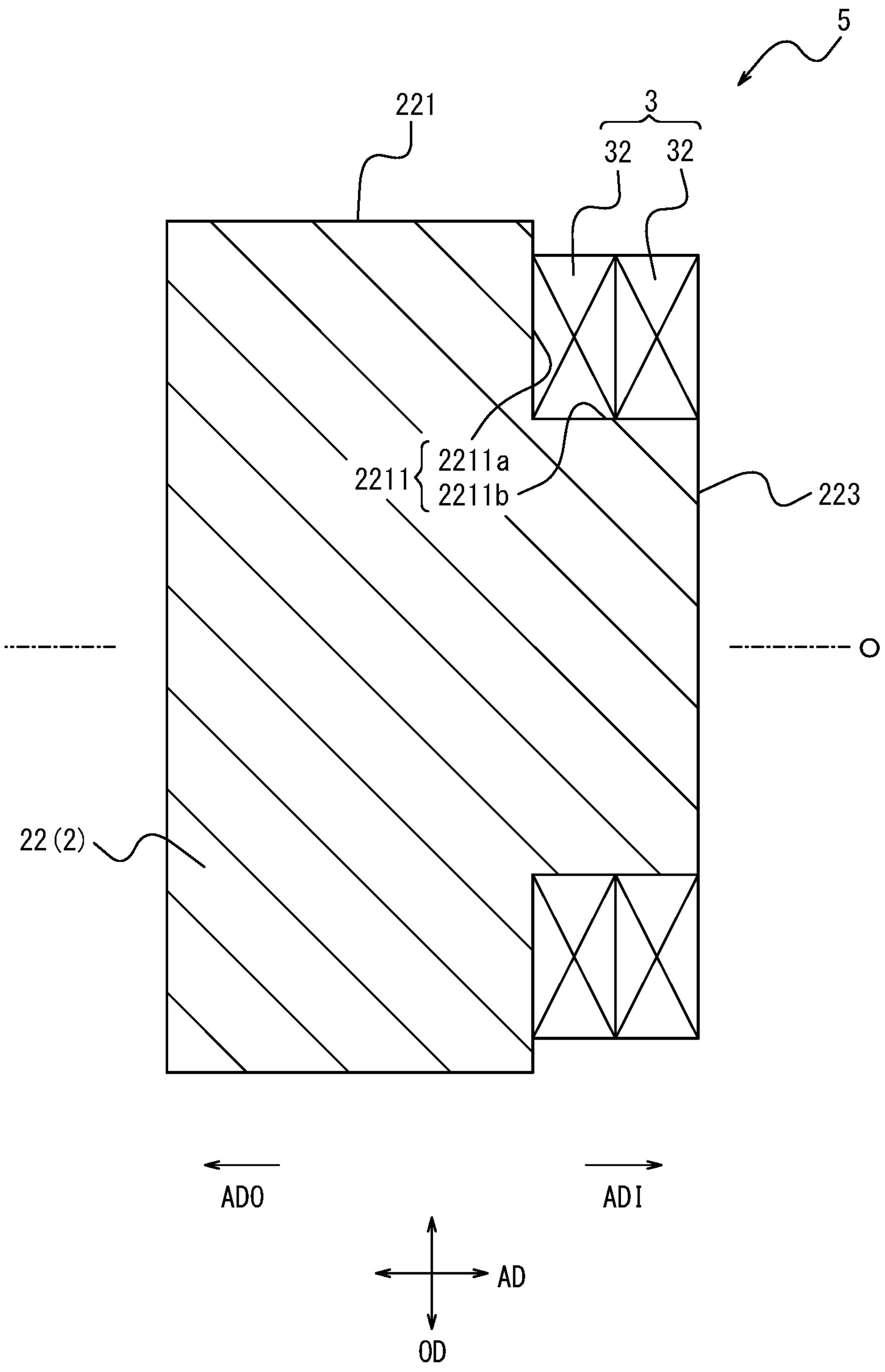
FIG. 8 is a sectional view schematically illustrating a fifth modification of a split iron core coil assembly.

In each example described in this specification, in at least one of the pair of split iron core coil assemblies 5, the superconducting coil 3 may have a single-stage structure consisting of only one layer in the axial direction AD as illustrated in FIGS. 1 to 7, or a multi-stage structure in which a plurality of superconducting coil layers 32 are arranged in the axial direction AD as illustrated in FIG. 8.

In each example described in this specification, a cooling plate (not illustrated) may be applied to the surface of the split iron core coil assembly 5 on the inner side in the axial direction ADI (specifically, the end surface 223 of the split iron core portion 22 on the inner side in the axial direction ADI and/or the end surface of the superconducting coil 3 on the inner side in the axial direction ADI) inside the vacuum heat-insulation container 4. In this case, it is more preferable that the superconducting coil 3 and the cooling plate are in contact with each other. Hence, the superconducting coil 3 can be cooled more effectively.

The cooling plate may be omitted.

In each example described in this specification, the end 21*a* of the yoke 21 and the wall 43 of the vacuum heat-insulation container 4 on the outer side in the axial direction are preferably separated from each other as illustrated in FIG. 2, but may be in contact with each other.

In each example described in this specification, the structures of the vacuum heat-insulation containers 4 and the split iron core coil assemblies 5 are preferably symmetric with respect to the center of the magnetic field generating device 1 in the axial direction AD, but may be asymmetric with respect to the center of the magnetic field generating device 1 in the axial direction AD.

In each example described in this specification, the magnetic field generating device 1 may include only one vacuum heat-insulation container 4. In this case, the pair of split iron core coil assemblies 5 are stored in the vacuum heat-insulation container 4, and the yoke 21 is located outside the vacuum heat-insulation container 4. In such a case, too, the size of the vacuum heat-insulation container 4 can be reduced as compared with the case where an undivided substantially C-shaped iron core and a pair of superconducting coils wound around a pair of ends of the iron core are entirely stored in a vacuum heat-insulation container.

For example, the vacuum heat-insulation container 4 in this case may have a structure in which the pair of vacuum heat-insulation containers 4 in the example in FIG. 1 are integrated by being connected to each other by a connecting pipe or the like.

INDUSTRIAL APPLICABILITY

The magnetic field generating device according to the present disclosure can be used for any purpose, such as a heating device for aluminum billets.

REFERENCE SIGNS LIST

1 magnetic field generating device
2 iron core
21 yoke
21*a* end
22 split iron core portion
221 outer circumferential surface
2211 stepped portion
2211*a* orthogonal surface
2211*b* axial surface
2212 groove
2212*a* groove wall surface
2212*b* groove bottom surface
2213 protrusion
2213*a* outer circumferential surface
222 wall portion
223 end surface on inner side in the axial direction
3 superconducting coil
31 outer circumferential surface
32 superconducting coil layer
4 vacuum heat-insulation container
41 upper wall
42 wall on inner side in the axial direction
43 wall on outer side in the axial direction
5 split iron core coil assembly
6 work space
7 support member
8 spacer member
O axis
AD axial direction (facing direction)
ADI inner side in the axial direction
ADO outer side in the axial direction
OD orthogonal-to-axis direction

The invention claimed is:

1. A magnetic field generating device comprising:

an iron core;

a pair of superconducting coils; and one or a pair of vacuum heat-insulation containers, wherein the iron core includes:

a substantially C-shaped or substantially U-shaped yoke; and a pair of split iron core portions that are formed separately from the yoke, are located inside the yoke, and face each other with a work space therebetween, each of the pair of superconducting coils is wound around a different one of the pair of split iron core portions in a circumferential direction about an axis that is parallel to a direction in which the pair of split iron core portions face each other, a pair of split iron core coil assemblies each composed of the split iron core portion and the superconducting coil wound around the split iron core portion are stored in the one or pair of vacuum heat-insulation containers, and the yoke is located outside the one or pair of vacuum heat-insulation containers.

2. The magnetic field generating device according to claim 1, wherein in at least one of the pair of split iron core coil assemblies, an outer circumferential surface of the split iron core portion has an annular stepped portion that faces the work space and is recessed toward an inner side in an orthogonal-to-axis direction, and the superconducting coil is wound around the stepped portion in the circumferential direction.

3. The magnetic field generating device according to claim 1, wherein in at least one of the pair of split iron core coil assemblies, an outer circumferential surface of the split iron core portion has an annular groove, and the superconducting coil is wound around the groove in the circumferential direction.

* * * * *